United States Patent [19]

Rottner et al.

[11] Patent Number: 5,325,150
[45] Date of Patent: Jun. 28, 1994

[54] PHOTOGRAPHIC SCANNER APPARATUS WITH REFLECTION AND TRANSMISSION DENSITOMETRY

[75] Inventors: Bruce E. Rottner; Walter D. Foley, both of Rochester; Dennis N. Beaulieu, Churchville, all of N.Y.

[73] Assignee: Eastman Kodak Company, Rochester, N.Y.

[21] Appl. No.: 55,045

[22] Filed: Apr. 29, 1993

[51] Int. Cl.[5] .................................. G03B 27/80
[52] U.S. Cl. ............................ 355/38; 355/68; 355/77
[58] Field of Search ................ 355/38, 68, 77, 83

[56] References Cited

U.S. PATENT DOCUMENTS

| | | | |
|---|---|---|---|
| 4,764,793 | 8/1988 | Goll | 355/38 |
| 4,774,548 | 9/1988 | Beaulieu et al. | 355/38 |
| 4,774,549 | 9/1988 | Morse | 355/38 |
| 4,933,710 | 6/1990 | Beaulieu | 355/38 |
| 4,975,737 | 12/1990 | Murooka et al. | 355/77 |

*Primary Examiner*—Richard A. Wintercorn
*Attorney, Agent, or Firm*—Frank H. Boos

[57] ABSTRACT

Film scanner apparatus for a photographic printer system in which the film scanner is provided with reflection and transmission densitometry capability using a single light source for film scanning as well as both transmission and reflection densitometry.

4 Claims, 3 Drawing Sheets

PHOTOGRAPHIC SCANNER APPARATUS WITH REFLECTION AND TRANSMISSION DENSITOMETRY

FIELD OF INVENTION

This invention relates to the field of photographic film scanners and more particularly to improved apparatus for reflection and transmission density measurement in photographic scanners.

BACKGROUND

In the photofinishing art, reflection and transmission densitometry is conventionally employed for calibration of the photofinishing system. In one known printer system, depicted in commonly assigned U.S. Pat. No. 4,933,710—Beaulieu et al, a photographic film scanner is provided that employs a single light sensor, or detector, for both the negative scanning and densitometry functions. However, two light sources are used in the disclosed scanner arrangement. One light source is used for scanning color negatives and for transmission densitometry measurements and a separate light source is used for reflection densitometry measurements. The use of two separate light sources is disadvantageous since it increases parts cost, power source requirements and space allocation and also requires the use of two separate sets of optical filters. It is desirable, therefore, to provide a photographic film scanner system that employs a single light source for both negative scanning and transmission/reflection densitometry.

SUMMARY OF THE INVENTION

In accordance with the present invention, therefore, photographic film scanner apparatus is provided which comprises a film scanning light source, a film gate, and a light sensor for converting light from the light source exposed through film in the film gate into density representative signals. The scanner apparatus further includes a densitometer read head for reading at least reflection density of a photographic medium in the read head, first light directing means effective when densitometer readings are to be made for blocking transmission of light directly from the light source to the film gate and for redirecting the light from the light source to the densitometer read head, and second light directing means for transmitting light from the densitometer read head to the light sensor.

DETAILED DESCRIPTION

Figure 1:
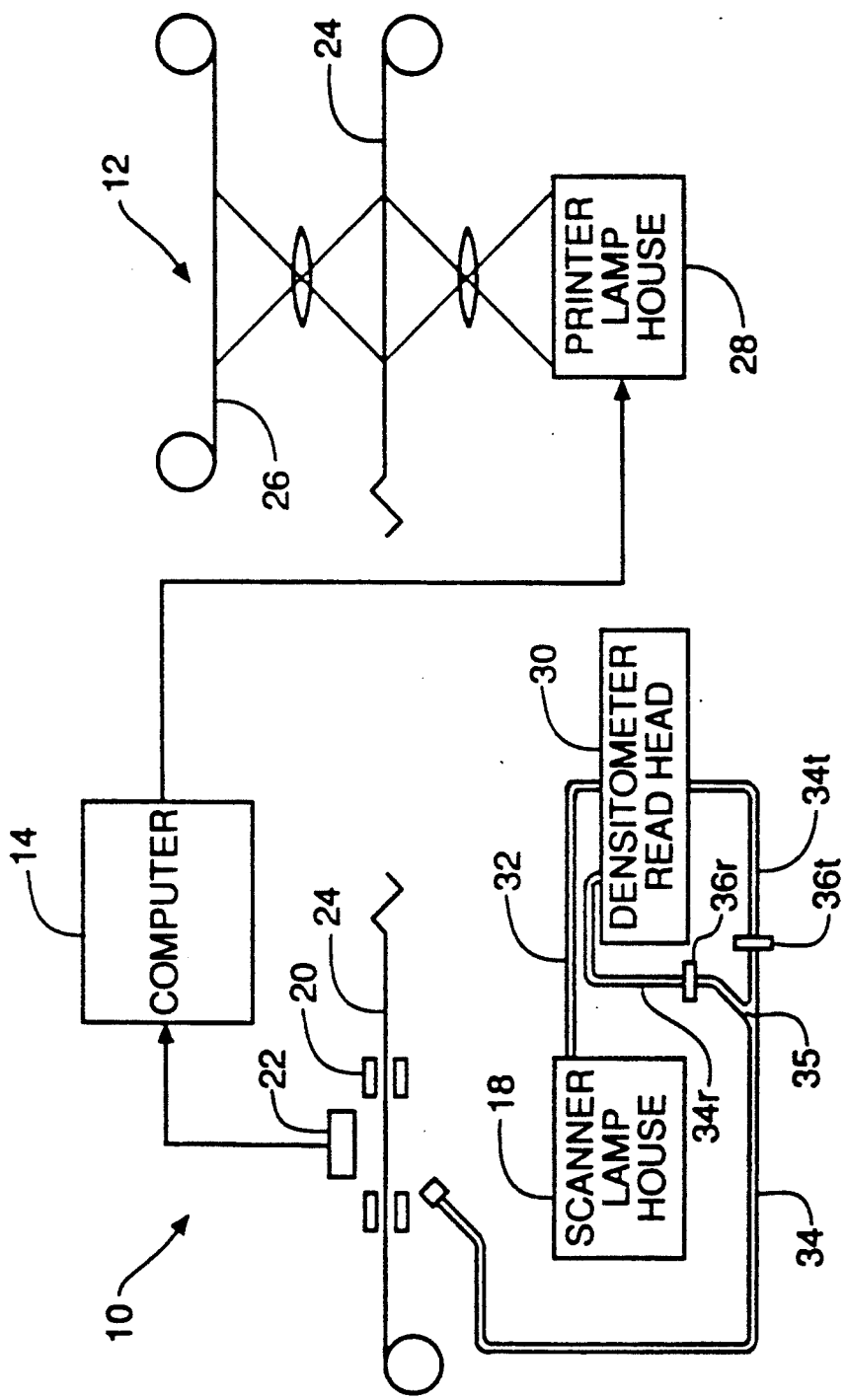
FIG. 1 is a schematic illustration of a photographic printer system including photographic film scanner apparatus embodying the present invention.

Referring to FIG. 1 the illustrated photographic printer system comprises photographic film scanner apparatus 10, a printer station 12 and a computer 14. Scanner apparatus 10 includes a scanner lamp house 18, a film gate 20 and a light sensor 22. Lamp house 18 conventionally includes a scanner light source to transmit light through an image frame on film strip 24 positioned in film gate 20 onto light sensor 22. Light sensor 22 may be a solid state CCD light sensor, preferably of the tri-linear type, for converting light from the film image into R, G and B electrical signals representative of film density values of elemental areas in the film image. These signals are digitized and converted in computer 14 into color balance and exposure control signals applied to the printer station 12 to control exposure of the film image onto print paper strip 26.

In accordance with the invention, photographic scanner apparatus 10 includes a densitometer read head 30 for reading at least reflection density of a photographic medium such as a test print. As will be seen, read head 30 may also be provided with capability for reading transmission densities of test film strips. The light source for read head 30 is provided by first light directing means, including fiber optics bundle 32, for coupling light from the scanner lamp house 18 to an input of the read head 30. As will be seen with reference to FIGS. 2 and 5, provision is also made blocking direct light transmission to the film gate 20 when densitometry measurements are to be made with read head 30. Second light directing means in the form of fiber optics bundle 34 is provided to direct density representative light from read head 30 to film gate 20 where the light from the fiber optics bundle is exposed onto the CCD sensor 22. Assuming read head 30 is capable of reading both reflection and transmission density, fiber optics bundle 34 is divided at junction 35 into a first sub-bundle 34r carrying the reflection density information and a second sub-bundle 34t carrying the transmission density information.

Figure 2:
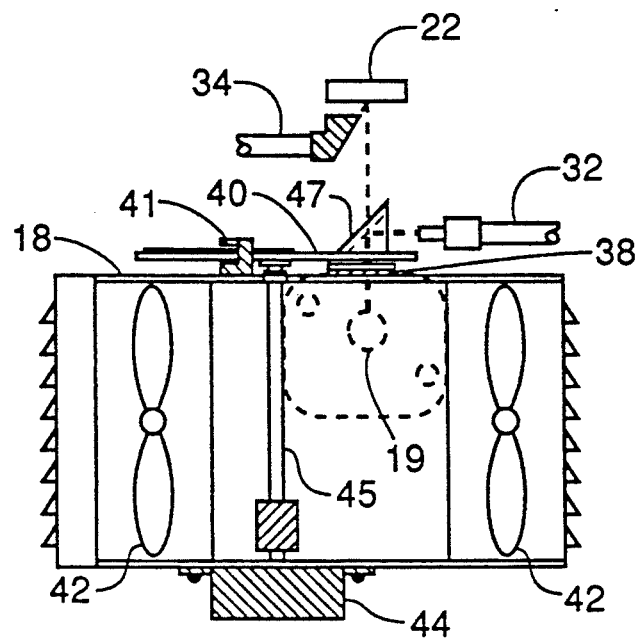
FIGS. 2–4 show, schematically, components of a film scanner and densitometer useful in the scanner apparatus of FIG. 1 and illustrating a first embodiment of the present invention.
Figure 3:
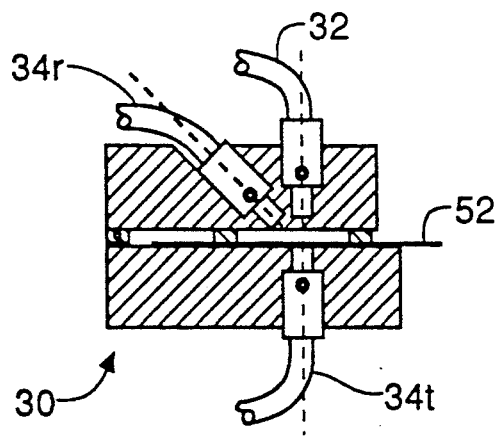
Figure 4:
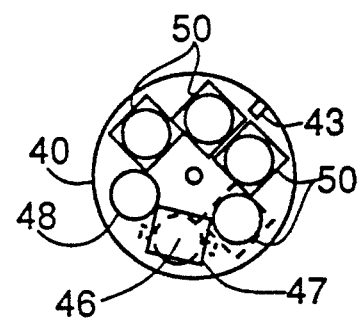

Referring jointly to FIGS. 2–4, an embodiment of the invention is illustrated in which read head 30 is provided with the capability for both transmission and reflection density reading. In this arrangement, scanner lamp house includes a scanner light source 19, and a rotatable filter wheel 40 driven in controlled manner by a stepper motor 44 via a supporting drive shaft 45. Fans 42 are provided to cool the lamp house. As seen in FIG. 4, filter wheel 40 is provided with a plurality of aperture positions spaced circumferentially around the wheel. Aperture 48 is an open aperture used for normal film scanning operation. Aperture 46 is covered with a reflecting prism 47 so that, when positioned over the light source 19, the light is blocked against direct transmission to the film gate 20 and is redirected to fiber optic bundle 32 leading to the densitometer read head 30. The remaining apertures are covered with calibration filters 50 used for scanner calibration. An opto sensor 41 is used in cooperation with a position reference notch 43 on filter wheel 40 for the proper rotational positioning of filter wheel 40.

In normal film scanner operation, light from light source 19 passes upwardly through a conventional IR filter 38 and open aperture 48 on filter wheel 40 through the film gate 20 and film 24 (FIG. 1) onto CCD sensor 22. When it is desired to perform densitometer readings, filter wheel 40 is advanced by stepper motor 44 to position prism 47 over the light source 19 to block the light from reaching sensor 22 directly and to redirect the light into fiber optic bundle 32. In FIG. 3, a configuration for densitometer read head 30 is shown which allows for both reflection and transmission densitometry using the single light source from the scanner lamp house. Thus the light source is coupled into read head 30 by fiber optic bundle 32 to illuminate a photographic medium 52. Assuming the medium 52 is a film negative or transparency, the light passing through the film is coupled into fiber optic bundle 34t for transmission to sensor 22. A shutter 36r may be provided to block any stray reflection of light through fiber optic bundle 34r during transmission densitometry. If the medium 52 is a reflection print, the reflected light is coupled back into fiber optic bundle 34r for transmission to sensor 22. A shutter 36t is provided to block light through fiber optic bundle 34t during reflection densitometry.

Figure 5:
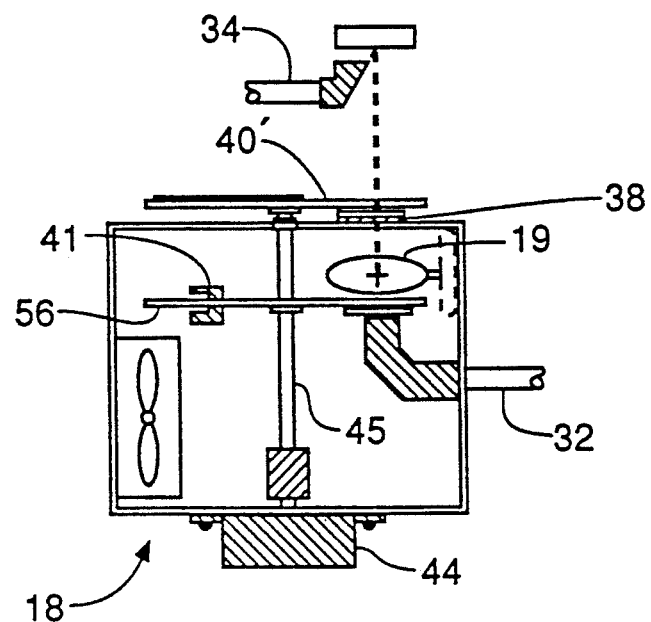
FIGS. 5–7 show, schematically, components of a film scanner and densitometer useful in the scanner apparatus of FIG. 1 and illustrating an alternative embodiment of the present invention.
Figure 6:
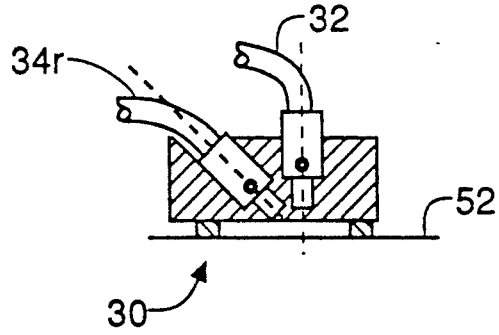
Figure 7:
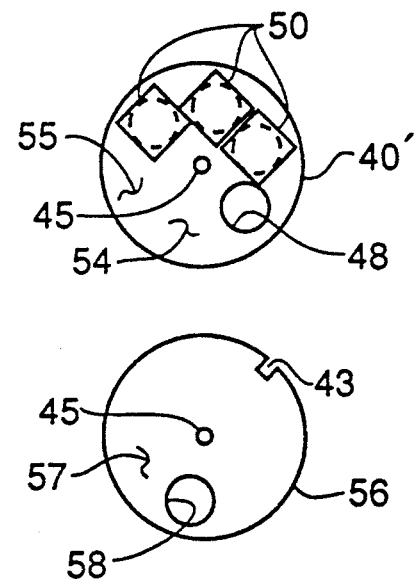

Referring now to FIGS. 5-7, an alternative embodiment of the invention is shown in which read head 30 is used solely for reflection densitometry measurement. In this arrangement, scanning lamp house 18 includes light source 19, IR filter 38 and a filter wheel 40 bearing an open aperture to allow for normal scanning of film images. The open aperture on filter wheel 40 is also employed for transmission densitometry measurements of test film strips placed in the normal scanning film gate 20 (FIG. 1). When reflection densitometry is to be performed, the means for blocking light from reaching sensor 22 directly comprises a solid portion 54 serving as a light blocking shutter on filter wheel 40' (FIG. 7) in place of the reflecting prism 46 on the filter wheel 40 of FIG. 4. Redirection of the light from light source 19 is accomplished by means of a shutter wheel 56 bearing an open aperture 58. Shutter wheel 56 is mounted on drive shaft 45 with open aperture 58 aligned with the light blocking shutter portion 54 on filter wheel 40'. Additionally to enable calibration of scanner linearily aligned light blocking portions 55 and 57 may be provided on filter wheel 40 and shutter wheel 56 to completely block any light from reaching sensor 22. A reference position notch 43 on shutter wheel 56 cooperates with opto sensor 41 for positioning control of the combined wheels 40', 56.

It will be appreciated from the foregoing that what has been disclosed is a simple arrangement of a film scanner and densitometer in which both transmission and reflection densitometry is accomplished with a single scanner light source serving as both a film scanner and densitometer light source. The invention has been described in detail with particular reference to presently preferred embodiments. However, it will be understood that variations and modifications can be effected within the scope of the invention as set forth in the claims appended hereto. For example, the scanner light sensor may alternatively comprise a two dimensional CCD area array, a linear photodiode or an area photodiode.

In the accompanying drawings, the following reference numerals are employed.

10 film scanner apparatus
12 printer station
14 computer
18 scanner lamp house
19 scanner light source
20 film gate
22 light sensor
24 film strip
26 print paper strip
28 printer lamp house
30 densitometer read head
32 first fiber optic bundle
34 second fiber optic bundle
40 filter wheel
41 opto sensor
42 cooling fans
43 wheel positioning notch
44 stepper motor
45 drive shaft
47 reflecting prism
48 open aperture
50 calibration filters
52 photographic
54 solid shutter portion
56 shutter wheel
58 aperture

What is claimed is:

1. Photographic film scanner apparatus comprising;
   a film scanner station including a scanner light source, a film gate, and a light sensor for converting light from the light source exposed through film in the film gate into signals representative of transmission densities of elemental image areas on the film;
   a densitometer read head adapted for reading at least reflection densities of photographic media in the read head;
   first light directing means effective during reading of density in the read head for blocking direct transmission of light from the scanning light source to the film gate and for redirecting light from the light source to the read head; and
   second light directing means for directing light from the read head representing density information derived from the photographic medium to the light sensor at the scanning station film gate.

2. Photographic scanner apparatus of claim 1 wherein said read head is adapted for reading either transmission density or reflection density information from a photographic medium placed in the read head; and wherein said second light directing means includes a first light path for transmission density information and a second light path for reflection density information.

3. Photographic scanner apparatus of claim 2 wherein said scanner station includes a filter wheel having a plurality of apertures positionable in the light path between said scanning light source and said light sensor at least one of said apertures being completely open to allow normal scanning of film images in the film gate and wherein said first light directing means includes a reflecting prism mounted over another of said apertures to block said light from directly reaching the light sensor and to redirect said light to said read head.

4. Photographic scanner apparatus according to claim 1 wherein said scanner station includes a filter wheel having a plurality of apertures positionable in the light path between said scanning light source and said light sensor, at least one of said apertures being completely open to allow normal scanning of film images in the film gate and wherein said first light directing means includes a light blocking shutter position on said filter wheel and further includes a shutter wheel on the opposite side of said scanner light source from the light sensor and being rotatable with the filter wheel, the shutter wheel normally blocking light from the light source and having an open aperture aligned with the light blocking shutter position on the filter wheel, said filter wheel and shutter being so positioned for reflection densitometer reading to simultaneously block direct light transmission to the light sensor and allow directing of the light to the read head.

* * * * *